Oct. 29, 1963     J. C. ANDERSON     3,109,156
PROCESS FOR COMBINING SEISMIC INFORMATION
Filed March 22, 1960     2 Sheets-Sheet 1

INVENTOR.
JOHN C. ANDERSON
BY
ATTORNEY

Oct. 29, 1963     J. C. ANDERSON     3,109,156
PROCESS FOR COMBINING SEISMIC INFORMATION
Filed March 22, 1960     2 Sheets-Sheet 2

INVENTOR.
JOHN C. ANDERSON
ATTORNEY

United States Patent Office 3,109,156
Patented Oct. 29, 1963

3,109,156
PROCESS FOR COMBINING SEISMIC
INFORMATION
John C. Anderson, Houston, Tex., assignor to Sohio Petroleum Company, Cleveland, Ohio, a corporation of Ohio
Filed Mar. 22, 1960, Ser. No. 16,721
1 Claim. (Cl. 340—15.5)

This invention relates to a process for combining seismic information that has been recorded magnetically.

In seismic prospecting, for the purpose of determining information about sub-surface geology, it is generally the practice to explode a charge of dynamite or other explosive in a shot-hole, or to impact the earth on the surface with a strong force, for the purpose of creating seismic waves which are projected through the sub-surface formations. When these waves reach a strata in the earth's formation which is capable of reflecting them, they are reflected back to the earth's surface where they can be detected by an instrument known generally as a seismometer. A plurality of seismometers usually are placed at predetermined distances from the seismic wave generating means and the information from the plurality of these seismometers may be studied to gain information about the inclination and depth of the strata from which reflections are received.

It is also possible to generate seismic waves from explosions at different depths in the same shot-hole and record the results with at least one seismometer located in the same or different positions. In addition, it is possible to generate seismic waves from locations spaced a substantial distance along the earth's surface and record the results with at least one seismometer located in the same or different positions.

It is now common to feed the electrical output of the seismometers, after amplication, to a transducer and record the output magnetically on magnetic tape. This is done in the field using either amplitude modulation or frequency modulation but in accordance with this invention, amplitude modulation recording is preferred.

My invention is concerned with a process of combining the magnetic recording from two or more magnetic tapes.

Referring to the drawings which constitute a part of this disclosure,

Figure 1:
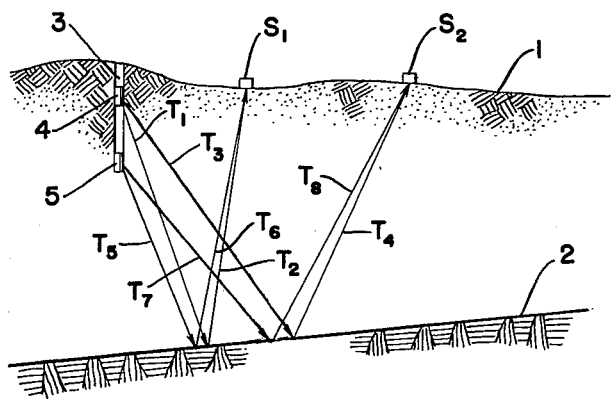
FIGURE 1 is a diagrammatic embodiment of a section of the earth's surface showing explosive charges at different depths in the same hole, the location of seismometers and the seismic wave paths and reflections from an inclined strata.

Referring now to FIGURE 1, the surface of the earth is indicated at 1 and a reflecting formation within the earth's surface is shown at 2. A shot-hole 3, which has been drilled into the earth, has an explosive charge set off part-way down the depth of the shot-hole, shown at 4.

The explosive charge sends out a plurality of waves which describe paths shown as $T_1$ and $T_3$. When these waves strike the formation 2, they are reflected and emerge to the earth's surface as reflections depicted as seismic wave paths $T_2$ and $T_4$ respectively. Seismometers located at positions $S_1$ and $S_2$ detect these reflections and the wave energy is converted into electrical energy which, through amplifiers and transducers is recorded on a magnetic tape, as is well understood in the art.

When a charge of explosive is set off at a lower position 5 in the hole 3, seismic wave paths $T_5$ and $T_7$ are generated similarly, but as can be seen from the illustration in FIGURE 1, these take a slightly different course and are reflected along wave paths $T_6$ and $T_8$ from the formation 2 at a slightly different point to reach the seismometers $S_1$ and $S_2$ located in the same position. As a result, two traces corresponding to wave paths $T_2$ and $T_6$ will be obtained at $S_1$ from the two explosive charges and can be recorded on separate magnetic tapes, and similarly, two traces corresponding to wave paths $T_4$ and $T_8$ will be obtained from the two charges set off separately and sequentially, and detected by seismometer $S_2$ and recorded on separate magnetic tapes.

Figure 2:
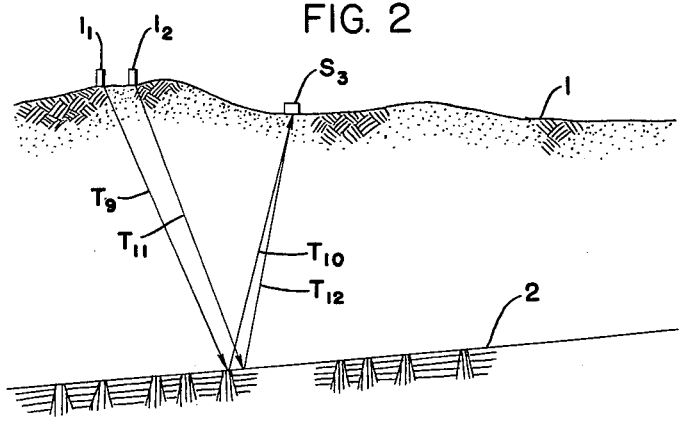
FIGURE 2 is a similar showing except that two waves are generated from two different points on the earth's surface and the seismic waves detected at a single seismometer station.

Similarly, reference to FIGURE 2 will show that when the earth is impacted at the point $I_1$, seismic wave traveling path $T_9$ will be reflected by the formation 2, as a seismic wave traveling path $T_{10}$ and detected by the seismometer $S_3$. If the earth is impacted at another point close by, $I_2$, a seismic wave traveling path $T_{11}$ will be generated and be reflected from the formation 2 as a wave traveling path $T_{12}$. Waves traveling both of these different reflected wave paths can be detected sequentially by the seismometer $S_3$ and recorded on two magnetic traces.

As these waves pass through the ground formation, there are disturbances within the ground which alter the wave form other than a reflection caused by an earth strata 2, or other reflecting strata in the earth's formation. Seismic waves hit small rocks and irregularities in the earth's formation which cause irregularities in the wave pattern, known in the art as "random noise." This is also caused by surface phenomena such as wind and circuit disturbances.

Figure 5:
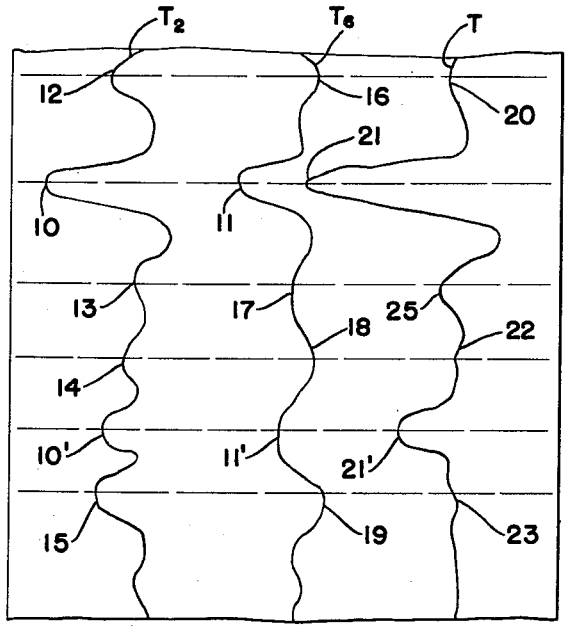
FIGURE 5 is a diagrammatic embodiment showing two seismic traces obtained from a seismometer at a single detection point and the combination of these two traces made in accordance with the invention.

As will be obvious from an inspection of FIGURES 1 and 2, the waves coming from the explosives 4 and 5 to seismometer $S_1$ take different paths $T_2$ and $T_6$, and waves from explosives 4 and 5 take different paths $T_4$ and $T_8$ reaching the seismometer $S_2$. Similarly, waves from the impacts $I_1$ and $I_2$ to seismometer $S_3$ take different paths $T_{10}$ and $T_{12}$. Since these waves will pass through different parts of the earth, each of them will pick up a different noise characteristic. This can be seen from an inspection of FIGURE 5, where two traces corresponding to wave paths $T_2$ and $T_6$ are recorded from the same seismometer $S_1$ but detecting two explosions 4 and 5 from different depths. FIGURE 5 could also be regarded as illustrating traces corresponding to wave paths $T_{10}$ and $T_{12}$ followed by waves from the disturbances created at different positions. The traces at the points 10 and 11 (FIG. 5) are called "reflections" since these are modulations in the wave form resulting from a reflection of the waves such as by an earth strata 2. Modulations 12, 13, 14, 15, 16, 17, 18 and 19 are modulations resulting from random noise. As is to be expected, the two traces corresponding to wave paths $T_2$ and $T_6$ where the modulations are caused by reflections, the modulations are always in the same direction or in phase. When the modulations, however, have a result of random noise, they may or may not coincide in direction or phase in the wave pattern.

I have discovered that a great portion of the random noise may be eliminated by combining a plurality of traces such as those corresponding to wave paths $T_2$ and $T_6$ by superimposing magnetic tapes containing two such traces and transducing the two superimposed tapes with a single transducer or magnetic playback head. Trace T shows the result of such a combination. The modulations 12 and 16 being opposite in phase partially cancel out, with the result that the noise modulation 20 is less in amplitude than either of the modulations 12 and 16. However, the combination of the reflection modulations 10 and 11 is reinforced to give a modulation 21 which is greater in amplitude than either of the modulations 10 and 11. The same thing is true when the out of phase noise modulations 14 and 18, and also 15 and 19, are combined to give noise elimination at the points 22 and 23. Another instance where the reflected information is reinforced by the combination of modulations from a reflected strata is shown at 10' and 11' to give a reinforced modulation 21'.

Of course, in some instances, the noise modulations may reinforce themselves, such as at 13 and 17, to give a modulation 25. However, because of the randomness of the noise, cancellations will be much greater than will be the reinforcements and the noise modulations in the combined trace will be much fewer, and the modulations due to reflections will stand out much better and can be more easily detected.

Figure 3:
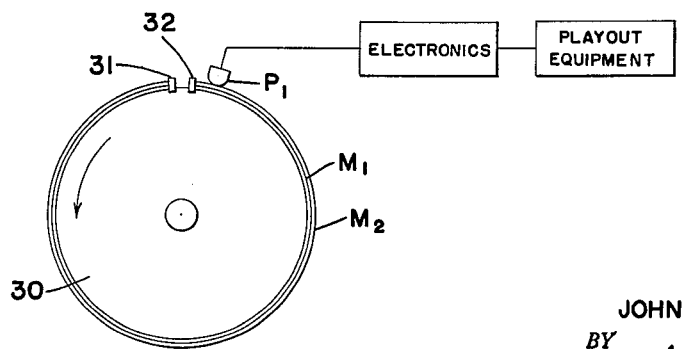
FIGURE 3 is a diagrammatic embodiment showing a cylindrical drum adapted to hold magnetic tapes, together with a transducer, i.e., a pickup or playback head, for detecting the magnetic information recorded on the tape.

Referring to FIGURE 3, there is shown a rotating drum adapted to hold a magnetic tape. In accordance with my invention, two such tapes $M_1$ and $M_2$ are fastened one on top of each other snugly around the drum by conventional fastening means 31 and 32. The superimposed magnetic tapes $M_1$ and $M_2$ containing the traces corresponding to wave paths $T_2$ and $T_6$ in superimposed position are then transduced with a usual transducer or playback head $P_1$ so that the electrical signal generated in the transducer is a combination of the signal stored in the superimposed magnetic tapes $M_1$ and $M_2$. This can be re-recorded on another tape.

I have discovered, in accordance with my invention, that the traces may be combined in this manner without any loss of fidelity for all practical purposes. While I do not intend that my invention shall be limited to any theory, this may be because in seismic recording, the frequencies are relatively low, generally, for the most part, being below 200 cycles per second, and at these frequencies there is not a loss in fidelity such as there might be at the higher frequencies characteristic of musical instruments.

In FIGURE 3, I have shown two superimposed tapes, but it is to be understood that three or four may be superimposed if, for example, three or four traces have been recorded from a single position on a seismometer. In addition, traces from two different seismometers, such as $S_1$ and $S_2$, may be combined in the same manner if a correction has been made for "normal move-out."

The magnetic tapes utilized in accordance with this invention are relatively thin being from about one to ten-thousandths of an inch in thickness with a magnetic coating thereon less than one-thousandth of an inch thick. Generally the tapes are three-thousandths or five-thousandths of an inch thick and as such, the tapes are so thin that they can be superimposed in the manner described without any noticeable loss in fidelity.

Figure 4:
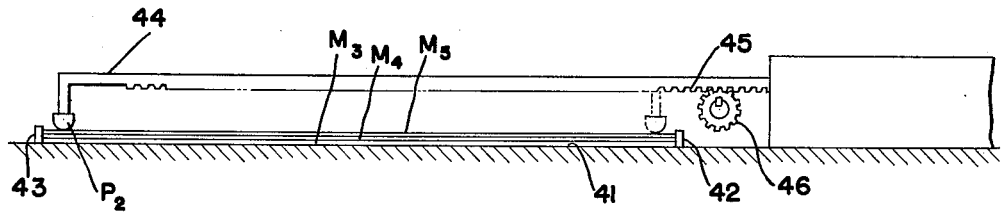
FIGURE 4 is an alternative embodiment for playing back the information on magnetic tapes in which the tapes are mounted in flat position and the transducer is moved relative to the surface of the tape.

It is also possible to superimpose the tapes in a flat position, such as shown in FIGURE 4. In this embodiment, a smooth flat plane surface 41 is provided on which three magnetic tapes $M_3$, $M_4$ and $M_5$ are superimposed and held at their ends by conventional fastening means 42 and 43. A transducer for playback head $P_2$ is moved by an arm 44 at a uniform rate of speed against the superimposed tape, such as for instance, by means of a rack 45 driven by a constant speed rotating pinion 46. Similarly, the transducer may be fixed and the plane surface 41 carrying the superimposed tapes may be moved past the fixed transducer.

It can also be seen from the geometry involved that as the number of tapes superimposed is increased, when applied to the drum 30 shown in FIGURE 3, the circumference of each tape will be slightly greater because of the thickness of the tape. If the number of the superimposed tapes is too large, the modulations between the inside and the outside tape may be displaced sufficiently to interfere with fidelity, and in such instances, such as when three or more tapes are superimposed, it may be preferred to do them while they are in flat form, as shown in FIGURE 4. However, two superimposed tapes, and sometimes three, can be satisfactorily combined by means of a drum such as shown in FIGURE 3.

Having described my invention, what I claim is:

In the art of seismic survey wherein a plurality of sequential seismic disturbances are created, each generating a sequential series of seismic waves composed of reflection modulations and random noise modulations, and wherein said series of waves generated by each disturbance progressively arrives at and is detected by a suitably located seismometer, and is then progressively recorded as a magnetic trace whereby a series of traces are provided each trace corresponding to the sequential series of waves generated by one of said seismic disturbances, each such trace having portions corresponding to reflection modulations and other portions corresponding to random noise modulations; the method of rectifying such traces which comprises combining the aforesaid series of magnetic traces in vertically aligned contiguous superimposed position, whereby the portions of each trace corresponding to the reflection modulations are in substantially superimposed vertical alignment, transducing the traces so combined to provide an output signal which corresponds to the combined traces, and re-recording the resultant output signal as a single magnetic trace in which the prominence of trace portions corresponding to reflection modulations is increased while the prominence of trace portions corresponding to random noise modulations is minimized.

References Cited in the file of this patent
UNITED STATES PATENTS

| | | |
|---|---|---|
| 2,243,729 | Ellis | May 27, 1941 |
| 2,882,988 | Dobrin | Apr. 21, 1959 |